Patented Dec. 16, 1924.

1,519,789

UNITED STATES PATENT OFFICE.

EDWARD JAMES MOOKLAR, OF KALAHEO, KAUAI, TERRITORY OF HAWAII.

PROCESS OF PRODUCING A FOOD PRODUCT.

No Drawing. Application filed December 5, 1922. Serial No. 605,078.

*To all whom it may concern:*

Be it known that I, EDWARD JAMES MOOKLAR, a citizen of the United States, and a resident of Kalaheo, Island of Kauai, Territory of Hawaii, have invented a new and Improved Process of Producing a Food Product, of which the following is a full, clear, and exact description.

This invention relates to a process of producing a food product which may be used as artificial coffee or artificial licorice. The product may be used as a substitute for licorice in candies, confections, liquors, cough syrups, medicines, tobacco, and other articles, or may be used to produce a drink, or beverage.

The invention is an improvement over my former Patent No. 1,141,816, issued June 1, 1915. In my former patent the invention related to a process for producing a substitute coffee from specially treated fruit or pods, including the seeds, of the trees of the botanical genus known as the algarobas (*Prosopis juliflora* and *Prosopis glandulosa*). The present invention contemplates using the method set forth in the patent, and, in addition, a number of further steps whereby pods or fruits of other trees plants or shrubs may be utilized for securing a substitute coffee or a substitute licorice.

In the present ivention, in addition to using the fruit of the algarobas, the fruit of other trees may be used, as, for instance, the mature fruit or pods of the honey locust, the *Ceretonia siliqua*, and all other plants or trees or shrubs of the leguminosea family bearing fruit or pods containing a sweet, edible pulp susceptible of being treated as set forth in the above mentioned patent, and also, susceptible of being treated as hereinafter specified for producing a coffee substitute or a licorice substitute.

The fruits above specified, particularly those of the honey locust and the *Ceretonia siliqua*, possess a native or natural odor which is more or less objectionable, because it is retained or persists in the final products when following the process set forth in my above mentioned patent. It is desirable to remove this odor at an early stage in the treatment of the fruit or pods, and, to accomplish this result, the mature fruits or pods are rolled or crushed whole, and, while in this crushed state, subject the thus exposed inner pulp to a deodorizing process by means of live steam, for causing a volatilization and oxidation of the objectionable matter forming the odor. This deodorizing process is accomplished in a revolving drum preferably provided with an outer shell whereby a space for steam-heating is furnished, in order that the drum may be heated as desired to prevent condensation of moisture in the inner chamber of the drum. The crushed fruit is placed in the inner drum and steam is intermittently turned on in this inner drum, while in the outer shell steam is admitted until temperature reaches a point at which condensation of moisture in the inner drum is prevented, approximately 214 degrees Fahrenheit. This precaution against condensation is necessary as the pulp is rich in soluble matter which would be wasted if drained off, and would more or less gum up the inner shell of the revolving drum. To further overcome condensation, the contents of the inner drum, namely, the crushed fruit, is subjected to intermittent steaming with live steam at approximately five pounds pressure, and to intermittent exhaustion or rarefaction under a vacuum of between twenty-six and twenty-nine inches of mercury, in five to ten minute intervals. Besides overcoming undue condensation, this treatment has the effect of eliminating the objectionable odor previously mentioned. Sample tests are made from time to time to regulate the period of treatment.

After the pulp has been deodorized as described, and it is desired to convert the pulp into a substitute coffee, the pulp is next impregnated with the aroma of coffee by forcing steam arising from boiling coffee laden with volatile aromatic constituents into the closed drum containing the deodorized material. The deodorized pulp may be also impregnated with the aroma of coffee by forcing under pressure the waste aromatic gases produced in roasting coffee into the matter in the drum while the drum is rotating, said gases being forced into the drum until the desired degree of impregnation has been secured.

Where it is desired to produce an artificial licorice from the deodorized pulp, several different steps may be used, either together or independently, for securing the desired result. If it be desired to impregnate the pulp with a licorice flavor, the oil or essence of anise is vaporized in a suitable vessel and said vapor is forced into the deodorized material in the drum while the drum is rotating. The forcing of this vapor into the drum is maintained until the desired degree of impregnation is secured, which may be ascertained by withdrawing samples from time to time. The oil used for impregnating is obtained from true anise seed (*Pimpinella anisum*) or from the star anise (*Illicium verum*). If preferred, aromatic derivatives of said oils, such as anethol, may be used, or synthetic compounds having an anise-like odor may be used for such impregnation.

After the pulp has thus been impregnated with the desired flavoring, the process as outlined in my prior patent above mentioned may be carried out, but an improvement I have discovered is to effect crystallization and roasting in practically a simultaneous operation prior to grinding into a meal, as, in roasting the meal it is very difficult to overcome losses due to burning of sugary mass in its granular or comminuted state, the product being inferior to that obtained by the improvement above mentioned of roasting pulp prior to grinding.

After the pulp has been roasted to a coffee-brown color it is ground into a meal. A beverage may be prepared therefrom or an extract secured therefrom by boiling with water, percolating and filtering and then desiccating to any desired degree of moisture content or down to a dry product which may be converted into a powder by grinding. The extract thus secured may be used in making candy or confectionery of any kind, or in cough syrups or in chewing or other forms of tobacco, or in a food product.

A beverage may be obtained by taking a tablespoonful of the ground roasted meal, placing it in one pint of boiling water and permitting water to continue to boil with the roasted meal in it for two or three minutes. The concoction is then removed and put aside to settle for two or three minutes, after which it should be strained and is then in condition for use, milk, cream and sugar being added as may suit one's taste. And a beverage may be obtained from the dry extract by placing a teaspoonful of the dry powder in a cup and pouring boiling water thereon and stirring until all is dissolved, then adding milk or cream and sugar to suit the taste.

Instead of securing the flavor of licorice or coffee through the use of impregnation as above described, quantities of ground or powdered coffee may be mixed with the ground roasted meal, or powdered coffee extract may be added to the ground dry extract obtained by boiling with water, percolating, filtering and desiccating as before mentioned. In the case of licorice, the meal may be mixed with the regular licorice of commerce either in the solid extract form or introduced as a powder from licorice root just prior to boiling, percolating and filtering.

The licorice substitute may be used in many ways, as, for instance, in the manufacture of candies, confections, cough syrups, tobacco and the like, while the coffee substitute is used principally for beverage purposes, though it may be used as a base or an ingredient in candies, confections and the like.

In this specification, where the fruit of the algaroba tree or fruit of some other special tree has been mentioned, it is to be understood that these particular fruits may be used or the fruit of any tree, which said fruit contains a sweet, edible pulp susceptible of being treated as above set forth.

What I claim is:

1. The process of producing a food product, comprising crushing or rolling fruit having the characteristics of the fruit of the algaroba tree, deodorizing the crushed or rolled fruit, and roasting the crushed fruit until the same has attained a coffee-brown color.

2. The process of producing a food product, comprising crushing fruit having the characteristics of the fruit of the algaroba tree, deodorizing said crushed fruit by heating and intermittently steaming the crushed fruit and drawing off the vapors arising therefrom, roasting the crushed fruit until the same has attained a brown color.

3. The process of producing a food product, comprising fruit having the characteristics of the fruit of the algaroba tree, deodorizing the crushed fruit, impregnating the pulp with a flavoring, roasting the crushed fruit until it becomes of a coffee-brown color, grinding the roasted fruit into a meal or powder, and extracting by boiling, percolating and filtering the water-soluble portion of the roasted meal or powder.

4. The process of producing a food product, comprising crushing fruit having the characteristics of the fruit of the algaroba tree, deodorizing the crushed fruit, impregnating the pulp with a flavoring, roasting the crushed fruit until it becomes of a coffee-brown color, grinding the roasted fruit into a meal or powder, extracting by boiling, percolating and filtering the water-soluble portion of the roasted meal or powder, and drying said water-soluble extract to any degree of moisture content or to a dry form, reducing the resultant product to a powder.

5. The process of producing a food product, comprising the crushing of fruit having the characteristics of the fruit of the algaroba tree, heating and intermittently subjecting the heated fruit to the vapor of live steam and to suction or rarefaction to remove the extracted odor, the heating and intermittent steaming and subjecting of the fruit to suction continuing until substantially all of the odor has been removed, then roasting said deodorized crushed fruit until it attains a coffee-brown color.

6. The process of producing a food product, comprising the deodorizing of fruit having the characteristics of the fruit of the algaroba tree, the drying of said fruit to the point of crystallization of the sugar contained in the fruit, roasting the crystallized fruit to a substantial brown color, and finally grinding said roasted fruit into a meal or powder.

7. The process of producing a food product, comprising deodorizing fruit having the characteristics of the fruit of the algaroba tree, impregnating the deodorized fruit with a flavoring, drying said fruit by raising the temperature thereof to approximately crystallizing point of sugar contained in the fruit, grinding said fruit to a meal, and then roasting said ground fruit until the color resembles that of roasted coffee.

8. The process of producing a food product, comprising crushing fruit having the characteristics of the fruit of the algaroba tree, deodorizing the crushed fruit, stirring said deodorized fruit in the presence of flavoring matter until a quantity of the flavoring matter has been absorbed by the fruit, roasting said flavored fruit until it attains a coffee-brown color, then grinding the roasted flavored fruit into a meal or powder, then extracting by means of boiling water, percolation and filtration the water-soluble portion of said roasted meal or powder down to a dry form or to any desired degree of moisture content, and then grinding, in the case of a dry extract, to a powder form.

EDWARD JAMES MOOKLAR.